(12) United States Patent
Nakagawa et al.

(10) Patent No.: US 6,393,396 B1
(45) Date of Patent: May 21, 2002

(54) METHOD AND APPARATUS FOR DISTINGUISHING SPEECH FROM NOISE

(75) Inventors: Kenichiro Nakagawa, Hino; Yasuhiro Komori, Kawasaki; Tetsuo Kosaka, Zama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/359,398

(22) Filed: Jul. 23, 1999

(30) Foreign Application Priority Data

Jul. 29, 1998 (JP) .......................................... 10-214095

(51) Int. Cl.[7] ........................ G01L 15/20; G01L 15/04; G01L 15/08
(52) U.S. Cl. ...................................... 704/233; 704/231
(58) Field of Search ................................ 704/214, 233, 704/226, 228, 231

(56) References Cited

U.S. PATENT DOCUMENTS

| 5,208,863 A | | 5/1993 | Sakurai et al. ................. 381/43 |
| 5,220,629 A | | 6/1993 | Kosaka et al. ................. 381/52 |
| 5,276,765 A | * | 1/1994 | Freeman et al. ............. 704/233 |
| 5,369,728 A | | 11/1994 | Kosaka et al. ............. 395/2.63 |
| 5,621,849 A | | 4/1997 | Sakurai et al. ................ 395/2.5 |
| 5,727,072 A | * | 3/1998 | Raman ........................ 704/233 |
| 5,761,639 A | * | 6/1998 | Takebayashi et al. ........ 704/233 |
| 5,787,396 A | | 7/1998 | Komori et al. ............. 704/256 |
| 5,797,116 A | | 8/1998 | Yamada et al. ................ 704/10 |
| 5,812,975 A | | 9/1998 | Komoti et al. ............... 704/256 |
| 5,845,047 A | | 12/1998 | Fukada et al. ............. 395/2.77 |
| 5,915,234 A | * | 6/1999 | Itoh ........................... 704/233 |
| 5,956,679 A | | 9/1999 | Komori et al. ............. 704/256 |
| 5,963,901 A | * | 10/1999 | Vahatalo et al. ............. 704/233 |
| 5,970,445 A | | 10/1999 | Yamamoto et al. ......... 704/230 |
| 6,167,375 A | * | 12/2000 | Miseki et al. ................ 704/233 |

* cited by examiner

*Primary Examiner*—Richemond Dorvil
*Assistant Examiner*—Daniel A. Nolan
(74) *Attorney, Agent, or Firm*—Fitzpatrick, Cella, Harper & Scinto

(57) ABSTRACT

An apparatus and method to successively extract a proper speech zone from speech inputted in such a fashion that noise is mixed in a speech to be recognized, and to remove noise from the detected speech zone. To this end, a noise position is estimated from an input waveform, a speech zone is detected from a speech inputted subsequently by using power information of speech at the estimated noise position, and noise is removed from the speech in the detected speech zone by using spectrum information of the speech at the estimated noise position. Further, the estimated noise zone is updated as appropriate by using a result of comparison between the power information of the input speech and the power information of the speech in the estimated noise zone so that the noise position is always properly estimated.

34 Claims, 4 Drawing Sheets

METHOD AND APPARATUS FOR DISTINGUISHING SPEECH FROM NOISE

BACKGROUND OF THE INVENTION

1. Field of the Invention

The present invention also relates to the art of producing speech suitable for speech recognition from input speech.

The present invention further relates to the art of extracting necessary information from input speech.

The present invention, in addition, relates to the art of processing speech mixed with noise.

2. Description of the Related Art

An interactive system for inputting information based on the recognition of speech uttered by a user and carrying out a process corresponding to the contents of the input information, e.g., outputting a response speech, has been proposed.

Also, in consideration of input speech being spoken in a noise environment, it has been thought to improve the detection rate of user speaking zones or the speech recognition rate by using noise data.

General methods of acquiring noise data are discussed below.

(1) A method of preparing several speech input devices includes placing one of the speech input devices near the user's mouth and the others at places remote from the user's mouth, and acquiring user speech and noise by the separate input devices at the same time.

(2) A method of preparing a noise training mode includes inhibiting the user from speaking, and taking in only noise before the user speaks.

The method (1) is advantageous in acquiring noise data in real time, but the user cannot use a plurality of speech input devices at the same time in many cases. In particular, personal computers that have become increasingly common these days each have only on microphone terminal, and therefore a system employing the method (1) has a difficulty in finding widespread use. The method (2) has the disadvantage that if sudden or peculiar noise is taken in during the noise training mode, noise data different from that produced in the actual environment is stored, and therefore all results of subsequent speech recognition are affected. Also, if noise taken in during the noise training mode differs from actual noise, the results of speech recognition are adversely affected. In addition, a noise training step requires redundant work for the user.

SUMMARY OF THE INVENTION

With the view of solving the above-stated problems in the related art, the present invention intends to realize speech recognition adaptively dealing with surrounding noise even when only one speech input device is employed.

Also, the present invention intends to realize speech recognition adaptively dealing with surrounding noise without a tiresome training work.

DESCRIPTION OF THE PREFERRED EMBODIMENTS

Figure 1:
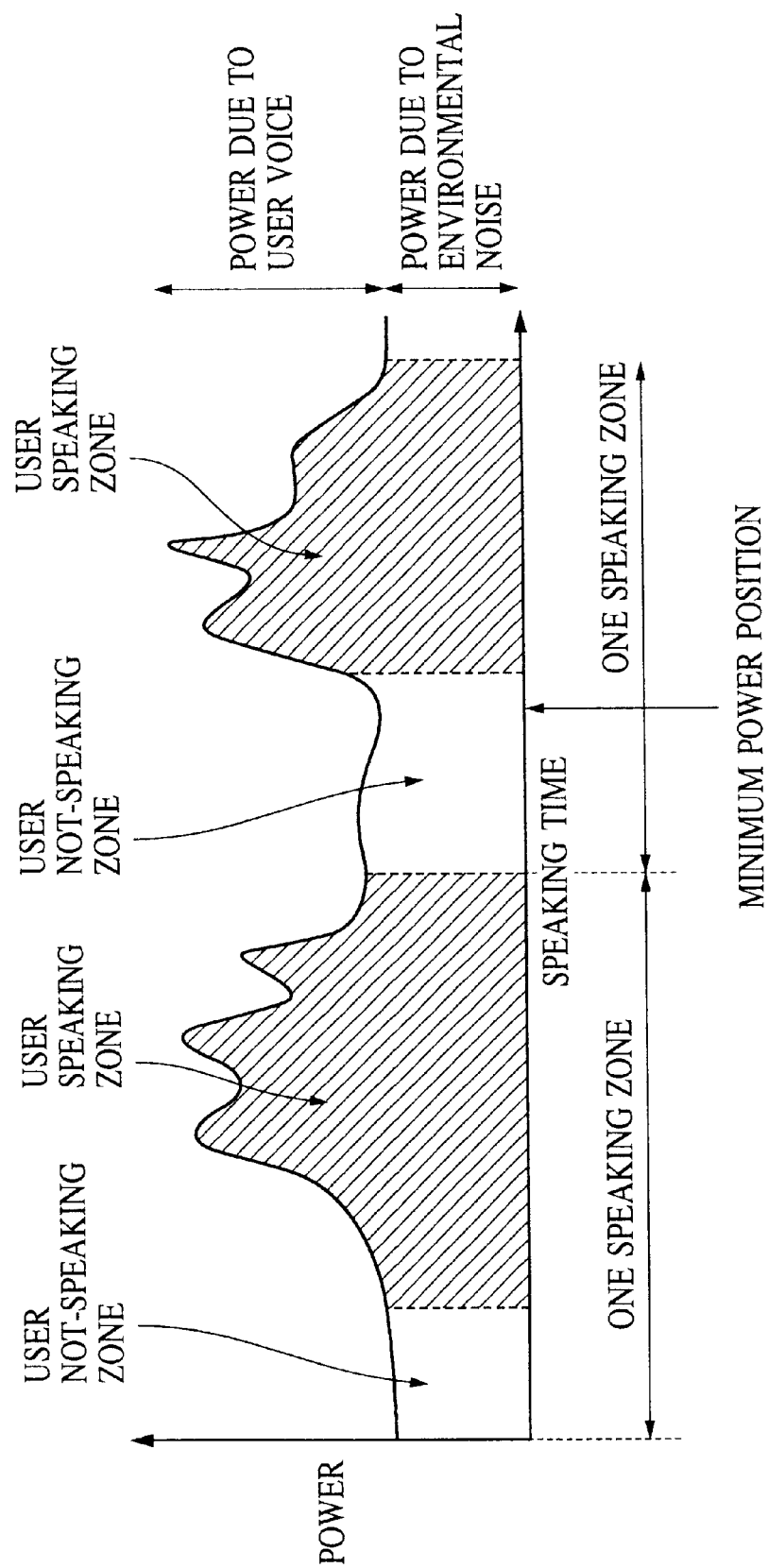
FIG. 1 is a chart for explaining input speech according to an embodiment of the present invention.

FIG. 1 is a chart for explaining the manner of estimating a noise zone. Considering that environmental noise always exists in the background of the user, an input waveform 100 taken in from a speech input device can be regarded as the simple sum of user speech and environmental noise. If there is a moment at which the user speaks nothing, data (input waveform) taken in at that moment represents the environmental noise itself.

It is therefore required to capture the moment at which the user speaks nothing. Because of such an expectation that the user speaks nothing once per several seconds for breathing or another reason, the moment at which the user speaks nothing can be found by seeking a position where the power of the observed waveform taken in for a certain period of time is a minimum.

Figure 2:
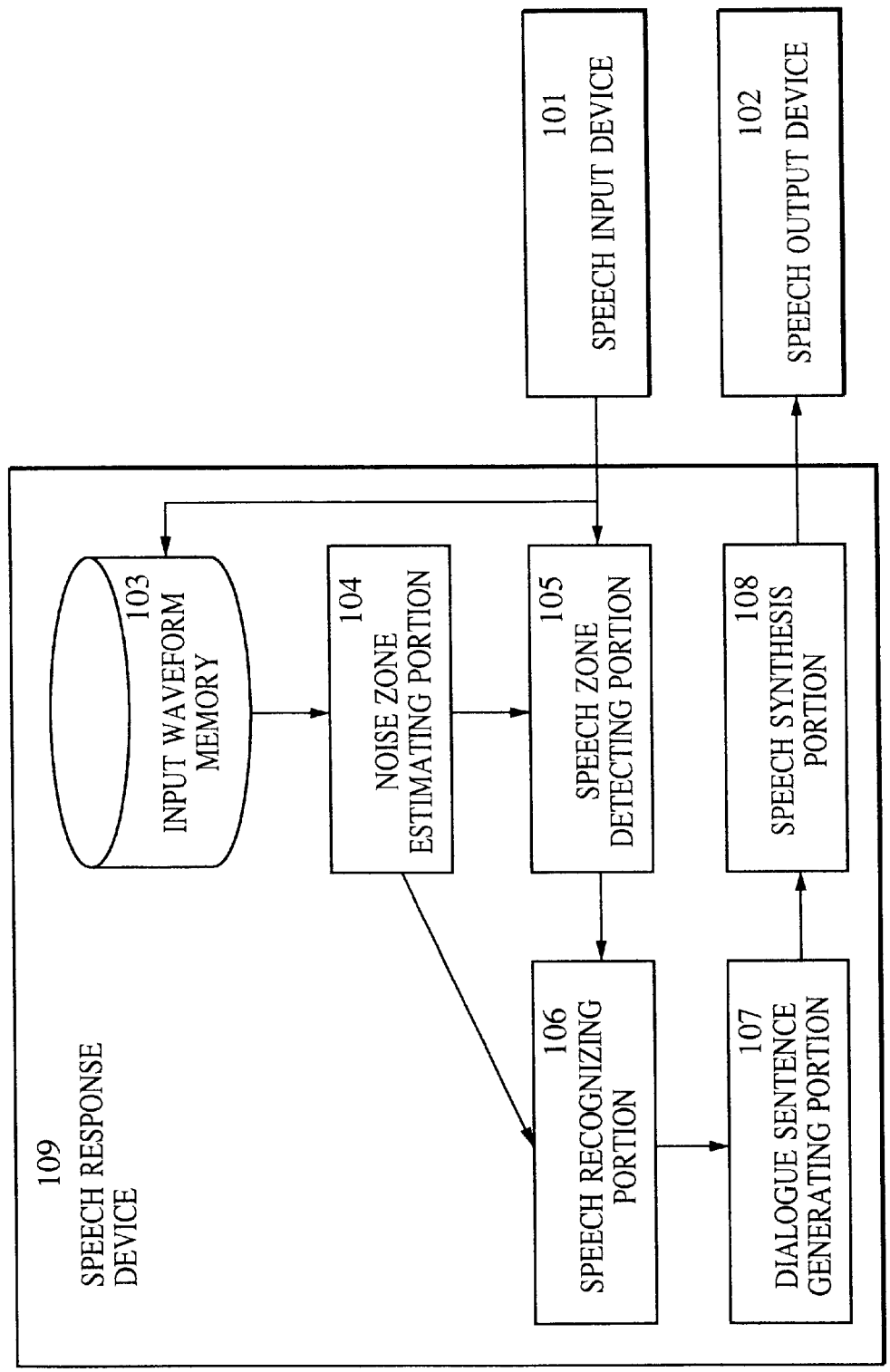
FIG. 2 is a functional block diagram of an apparatus according to the present invention.

FIG. 2 is a functional block diagram of an apparatus according to the present invention. An embodiment of the present invention will now be described with reference to FIG. 2.

A speech response device 109 receives a speech waveform from a speech input device 101, such as a microphone, and outputs a speech waveform from a speech output device 102 such as a loudspeaker. This arrangement enables the user to dialogue with the speech response device 109 by speech. The speech input device 101 and the speech output device 102 may be provided in any other terminal connected to the speech response device 109 via, e.g., a public line or LAN. With such a connection, a response system using the apparatus of the present invention can be utilized in telephones, etc.

The observed waveform inputted from the speech input device 101 is sent to a speech zone detecting portion 105 and an input waveform memory 103. The input waveform memory 103 stores speech data in a length corresponding to the latest certain period of time; for example, speech waveform data taken in during one speaking zone. The term "one speaking zone" refers to a period from the start of inputting of speech to a point of change to a first not-speaking zone, or a period from a point of change to one detected not-speaking zone to a point of change to the next not-speaking zone, and includes waveforms in both the not-speaking zone and the speaking zone. A noise zone estimating portion 104 estimates, from the speech waveform stored in the input waveform memory 103, a zone having minimum power and thereabout, e.g., a period of 0.1 second with a minimum power point being at the center, as a non-speech zone (noise zone). Then, the noise zone estimating portion 104 sends the power resulted from the waveform in the estimated non-speech zone to the speech zone detecting portion 105, and also sends the power spectrum of the waveform in the same zone to a speech recognizing portion 106. Here, the power and the power spectrum in the estimated non-speech zone, which are both sent from the noise zone estimating portion 104, may be average data calculated respectively by dividing the power and the power spectrum in the estimated non-speech zone by the number of frames in the same zone. Further, the noise zone estimating portion 104 calculates and holds a speech zone cutting-out threshold that is obtained, for example, by multiplying the input power in the estimated not-speech zone by a preset factor.

The speech zone detecting portion 105 performs a Power Subtraction process in which the input waveform entered from the speech input device 101 in real time is determined to be a waveform in a speech zone when the power of the input waveform is larger than the speech zone cutting-out threshold obtained from the noise power estimated by the noise zone estimating portion 104, and the above result continues for a certain period of time. The input waveform determined to be present in the speech zone by the Power Subtraction process is sent to the speech recognizing portion 106.

The speech recognizing portion 106 performs a Spectral Subtraction process in which the estimated noise power spectrum obtained in the noise zone estimating portion 104 is subtracted from the power spectrum of the input waveform in the speech zone sent from the speech zone detecting portion 105. With the Spectral Subtraction process, the power spectrum of only the speech is calculated from the observed power spectrum containing both the speech and noise in a mixed manner. Speech recognition is then carried out by matching the speech power spectrum, which is cleaned by removal of the noise therefrom, with speech dictionary data (acoustic models). A recognition result is sent to a dialogue sentence generating portion 107.

The dialogue sentence generating portion 107 generates a text of a suitable dialogue (response) sentence corresponding to the recognition result of the user speech. The generated text of the dialogue sentence is sent to a speech synthesis portion 108 for conversion into a speech waveform. The speech waveform is sent to the speech output device 102 such as a loudspeaker.

Figure 4:
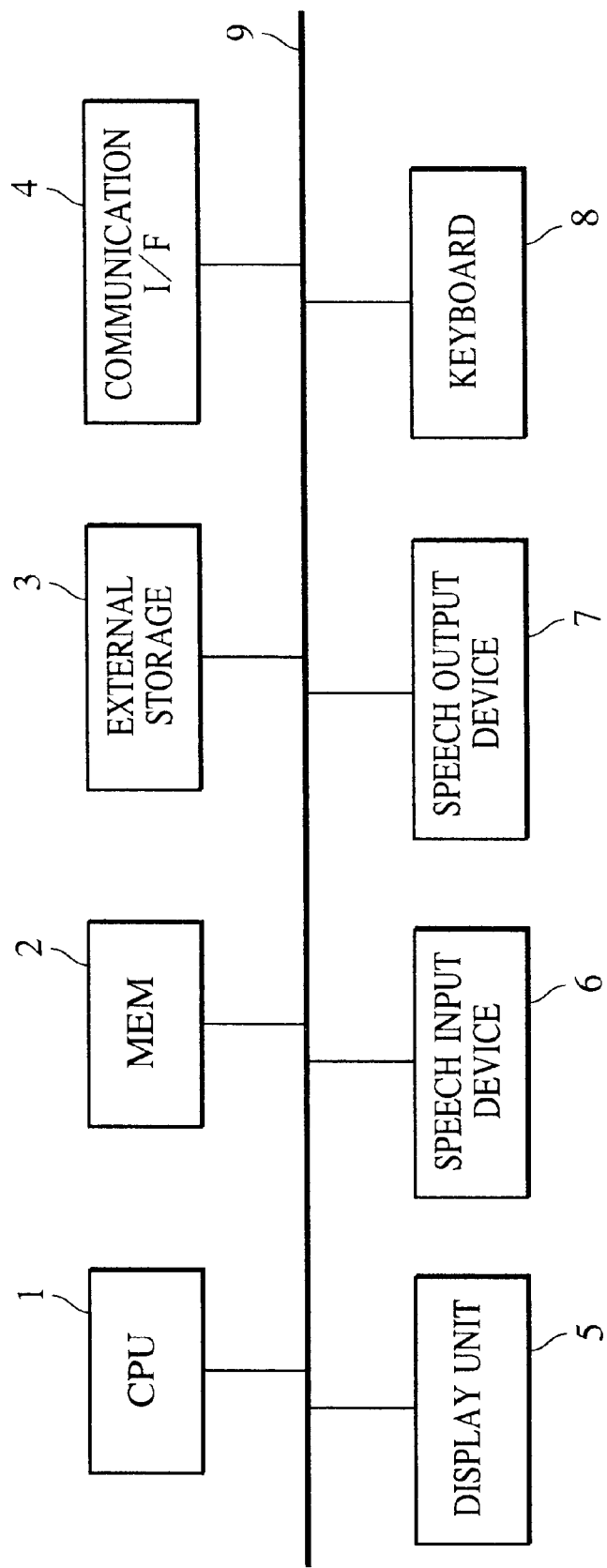
FIG. 4 is a diagram showing the hardware configuration of the apparatus according to the present invention.

A hardware configuration of the apparatus according to the present invention will be described below with reference to FIG. 4.

A CPU 1 controls and executes various processing in accordance with a control program stored in an MEM 2 or an external storage 3. The MEM 2 is a storage device which is provided in the apparatus of the present invention and comprises a ROM and a RAM. The MEM 2 stores various parameters, speech recognition dictionary data (acoustic models), text information outputted in response to the recognition results, a table of correspondence between the acoustic models and text information, the control program, and message data, which are employed in the processing executed according to the present invention, and also includes a working area. The external storage device 3 is a recording medium capable of being loaded into the apparatus of the present invention, such as a CD-ROM, CD R, FD and MO disk. The data stored in the MEM 2 may be downloaded from the external storage device 3. A communication I/F 4 executes control for enabling information to be transmitted to and received from another terminal via any communication means such as a public line or LAN. A display unit 5 is in the form of a CRT, LCD or the like, and displays a screen for prompting the user to enter speech, the recognition result, or an output screen corresponding to the recognition result. A speech input device 6 is a microphone, and a speech output device 7 is a loudspeaker. A microphone and a loudspeaker provided in another terminal connected via the communication I/F 4 may be used respectively as the speech input device 6 and the speech output device 7. A keyboard 8 includes a ten-key pad for entering numeral values and other keys for providing various instructions. A bus 9 serves to transmit and receive data between the various components.

Figure 3:
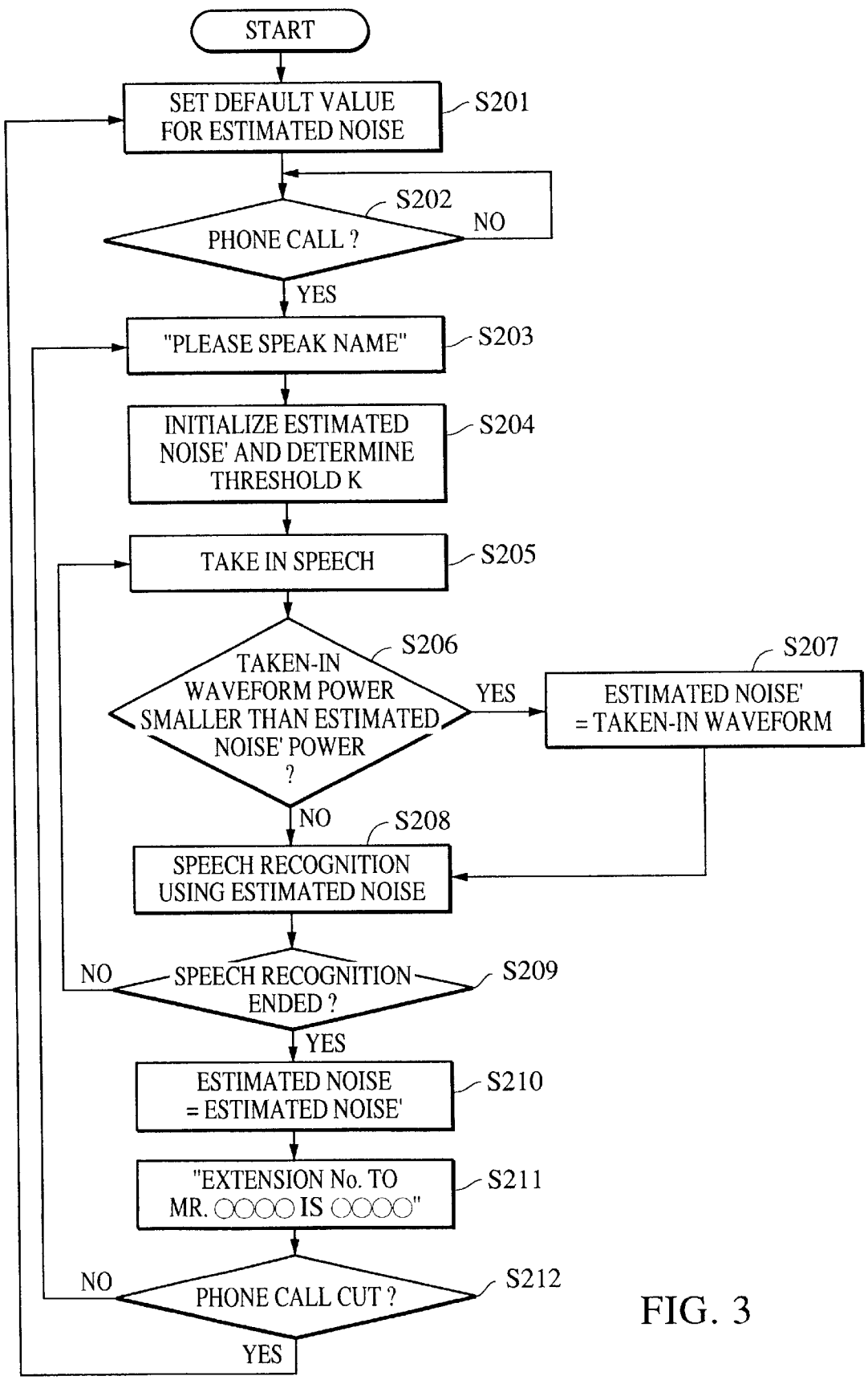
FIG. 3 is a flowchart of speech processing according to the present invention.

FIG. 3 is a flowchart of the entire processing according to the present invention. The processing is executed by the CPU 1 in accordance with the control program stored in the MEM 2 or the external storage device 3. An extension number guidance system for executing speech recognition of the name spoken by the user and informing the user of the extension number to the spoken name by outputting the number in speech will be described below, by way of example, with reference to the flowchart.

Also, the following description will be provided about an example in which the speech cutting-out threshold is changed and the speech waveform is modified by setting the minimum power and thereabout of the input waveform, which corresponds to user speech in the latest one speaking zone, to noise power.

Upon start-up of the system, a default value is set in a "estimated noise" parameter storing portion inside the MEM 2 (S201). The default value set in this step is zero, for example, and is used for cutting out the first speaking zone after the user has started inputting speech (i.e., for the Power Subtraction process). The control flow then enters a loop waiting for a phone call from the user (S202). If it is determined upon detection of a calling signal that a phone call is placed from the user, guidance for prompting the user to speak the name is read out of the MEM 2 and outputted (S203). The value in an "estimated noise" parameter storing portion inside the MEM 2 is then initialized (S204). The value used for the initialization in this step is a preset value stored in the MEM 2, and is given by, e.g., the maximum power value that is expected to be inputted. After the "estimated noise" parameter and the "estimated noise" parameter in the MEM 2 are both decided, a value between the maximum power and "estimated noise" parameters at a level corresponding to 80% from the smaller parameter is calculated as a threshold K for use in cutting out a speech zone. In other words, the difference between the two parameters is calculated, and the calculated difference is multiplied by 0.8. The resulting product is added to the smaller parameter, and a value of the resulting sum is stored in the MEM 2 (S204). The value of the threshold K is not limited to 80%, and can be selected appropriately based on experimental results, environment in use, etc. The value of the threshold K, however, should not be in excess of 100%. Then, speech is taken in for a certain period of time (about 10 ms) (S205), and the power of the taken-in speech is compared with the power of the "estimated noise" (S206). If it is determined in S206 that the power of the taken-in speech is smaller than the power of the "estimated noise", the value in the "estimated noise" parameter storing portion inside the MEM 2 is updated to the value of the speech power taken in step S205 (S207). Subsequently, speech recognition is performed (S208) after executing the Power Subtraction process by using the speech cutting-out threshold K stored in the MEM 2 and then modifying the input waveform through the Spectral Subtraction process. If it is determined that the input waveform taken in at that time is smaller than the threshold K and the speech is ended, the speech recognition is ended with the waveform so far inputted (S209), and the value of the "estimated noise" parameter is put in the "estimated noise" parameter storing portion inside the MEM 2 (S210). The extension number stored in the MEM 2 corresponding to a character string of the name, which resulted from the speech recognition in S208, is read out of the MEM 2 and outputted inform the user (S211). If the end of the speech zone is not determined in S209 and the speech recognition is not yet ended, the process of taking in speech is performed again (S205). The above-described processing is repeated until the user cuts the phone (S212).

With the process of S210, the "estimated noise" parameter in the latest one speaking zone can be used for recognition of the speech waveform next inputted.

As an alternative, the "estimated noise" parameter (noise power) may be derived before inputting of speech to be recognized. In this case, guidance for indicating a message "Please speak something for five seconds from now in order for the system to take in your speech" is read out of the MEM 2 and outputted between steps S202 and S203, followed by taking in speech for five seconds. After the elapse of five seconds, taking-in of the speech is ended and a position where power is a minimum in the observed waveform taken in at that time is sought. The minimum power and the spectrum information around that position are stored in the MEM 2 as noise power and noise spectrum information, respectively. The control flow then goes to step S203.

Subsequently, the processing in steps S205 to S207 is performed using the noise power obtained in the above described steps to execute the Power Subtraction process for cutting out only a zone containing the speech from the observed waveform taken in at that time. The Spectral Subtraction process is then executed using both the cut-out waveform and the noise spectrum information, thereby modifying the cut-out waveform into a clean waveform free from noise (S208). The process of removing noise with the Spectral Subtraction process in this step is performed in a like manner as described above by using the spectrum information that was derived from the waveform, from which the "estimated noise" parameter was also obtained, and has been stored in the MEM 2. Each time when the "estimated noise" parameter is updated in S207, the spectrum information corresponding to the position at which the noise power used for update is obtained, is also held in the MEM 2. The spectrum information is stored in the MEM 2 in step S210 for the Spectral Subtraction process. The thus-stored waveform is then used for executing speech recognition (S208).

With the above method, speech recognition can be performed using the noise generated at the time when the user utters speech. Therefore, if the user utters speech for a time shorter than five seconds and only noise is inputted within a part of that period, a high hit rate in the speech recognition is expected.

While, in the flowchart of FIG. 3, the power value and the spectrum information for use in the Power Subtraction process and the Spectral Subtraction process are obtained by seeking minimum power in one speaking zone and employing the waveform around the position providing the minimum power as a noise waveform, the present invention is not limited to the illustrated embodiment. For example, it is also possible to always monitor the minimum power in the latest speech for a preset length of several seconds, and to set the waveform around the position providing the minimum power to a noise waveform. In this case, the minimum value in the waveform for the latest several seconds can be always sought, for example, by providing a memory area, in which stored data makes a round for the preset several seconds, in the MEM 2, writing waveform power in the memory area whenever a waveform is taken in, and observing a minimum value in the memory area.

Also, in the flowchart of FIG. 3, the extension number is read and outputted, as one example of processing, in speech or characters to be communicated to the user in S211. On that occasion, however, automatic calling may be issued in accordance with the read extension number for transferring the phone call from the user. In this case, the processing may be modified such that if the phone call is not answered at the transferred party for a certain period of time, the transfer is canceled and the control flow returns to S203 for asking for another person's name.

Further, while the present invention has been described, by way of example, in connection with an extension relaying system operating in response to phone calls from users, the present invention is not limited to the illustrated embodiment. The present invention can be implemented in any applications by preparing information to be stored in the MEM 2 beforehand (i.e., information outputted in accordance with a code of the recognition result) such as is used for floor guidance at the reception of a building, traffic guidance until reaching the destination, and outputting of speech, characters and/or images in response to a speech input from users.

What is claimed is:

1. A speech processing method for processing a speech-and-noise-containing signal comprising at least one predetermined speaking zone comprising a user-not-speaking zone containing only a noise signal and a user-speaking zone containing a speech signal superimposed on the noise signal, said method comprising the steps of:

estimating the position of the user-not speaking zone in the at least one predetermined speaking zone;

extracting power information of the speech-and noise-containing signal at the estimated position of the user-not speaking zone; and detecting the position of the user-speaking zone by using the extracted power information extracted from the speech-and noise-containing signal at the estimated position of the user-not speaking zone.

2. A speech processing method according to claim 1, wherein said speech-and-noise-containing signal comprises a plurality of predetermined speaking zones, and wherein the position of the user-not speaking zone is estimated for each predetermined speaking zone.

3. A speech processing method according to claim 1, wherein the predetermined speaking zone starts at the start of the user-speaking zone.

4. A speech processing method according to claim 1, wherein said detecting step determines that a user-speaking zone is present at a position in the speech-and-noise-containing signal when the value of power information at the position exceeds a threshold defined between the extracted power information and a predetermined value.

5. A speech processing method according to claim 1, wherein said estimating step determines as the position of the user-not-speaking zone the position at which the power of the speech-and-noise-containing signal in the predetermined speaking zone is a minimum.

6. A speech processing method according to claim 1, further comprising the step of updating the value of the power information used to detect the position of a user-speaking zone in the next predetermined speaking zone in the speech-and-noise-containing signal by comparing the value of the extracted power information with the value of the power information of the speech-and-noise-containing signal in the next predetermined speaking zone, and setting the value of the power information used to detect the position of a user-speaking zone in the next predetermined speaking zone in the speech-and-noise-containing signal as the value of power information in the next predetermined speaking zone that is smaller than the value of the extracted power information when the value of the power information in the next predetermined speaking zone is smaller than the value of the extracted power information.

7. A speech processing method according to claim 1, further comprising the steps of extracting spectrum information of the speech-and-noise-containing signal at the estimated position to produce an extracted noise signal, and removing the extracted noise signal from the speech-and-noise-containing signal at the position of the detected user-speaking zone by using the extracted spectrum information.

8. A speech processing method according to claim 7, wherein said removing step produces speech data and wherein said method further comprises the step of subjecting the speech data to speech recognition.

9. A speech processing method according to claim 1, wherein the speech-and noise-containing signal is produced by a telephone in response to a user speaking into the telephone.

10. A speech processing method according to claim 1, further comprising the step of subjecting the speech-and-noise-containing signal at the detected user-speaking zone to speech recognition.

11. A speech processing method according to claim 10, further comprising the step of outputting information corresponding to a result of said speech recognition step.

12. A speech processing method according to claim 1, further comprising the step of:

calculating a speech-zone determining threshold only from the power characteristics of the user-not-speaking zone, wherein said detecting step detects the position of the user-speaking zone by applying the speech-zone determining threshold to the input speech-and-noise-containing signal and determining that a user-speaking zone exists at positions in the speech-and-noise-containing signal where the value of the power of the speech-and-noise-containing signal is above the speech-zone determining threshold.

13. A speech processing apparatus for processing a speech-and-noise-containing signal comprising at least one predetermined speaking zone comprising a user-not-speaking zone containing only a noise signal and a user-speaking zone containing a speech signal superimposed on the noise signal, said speech processing apparatus comprising:

a user-not-speaking-zone position estimating portion configured to estimate the position of the user-not speaking zone in the at least one predetermined speaking zone;

a power information extracting portion configured to extract power information of the speech-and noise-containing signal at the estimated position of the user-not-speaking zone; and a user-speaking-zone detecting portion configured to detect the position of the user-speaking zone by using the extracted power information extracted from the speech-and noise-containing signal at the estimated position of the user-not speaking zone.

14. A speech processing apparatus according to claim 13, wherein the speech-and-noise-containing signal comprises a plurality of predetermined speaking zones, and wherein said user-not-speaking-zone position estimating portion estimates the position of the user-not-speaking zone for each predetermined speaking zone.

15. A speech processing apparatus according to claim 13, wherein the predetermined speaking zone starts at the start of the user-speaking zone.

16. A speech processing apparatus according to claim 13, wherein said user-speaking-zone detecting portion determines that a user-speaking zone is present at a position in the speech-and-noise-containing signal when the value of the power information exceeds a threshold value defined between the value of the extracted power information and a predetermined value.

17. A speech processing apparatus according to claim 13, wherein said user-not-speaking-zone position estimating portion determines as the position of the user-not-speaking zone the position at which the power of the speech-and-noise-containing signal is a minimum.

18. A speech processing apparatus according to claim 13, further comprising a power comparing and updating portion configured to update the value of the power information used to detect the position of a user-speaking zone in the next predetermined speaking zone in the speech-and-noise-containing signal by comparing the value of the extracted power information with the value of the power information of the speech-and-noise-containing signal in the next predetermined speaking zone and setting the value of the power information used to detect the position of a user-speaking zone in the next predetermined speaking zone in the speech-and-noise-containing signal as the value of power information in the next predetermined speaking zone that is smaller than the value of the extracted power information when the value of the power information in the next predetermined speaking zone is smaller in value than said the value of the extracted power information.

19. A speech processing apparatus according to claim 18, wherein said user-zone-detecting portion detects a user-speaking Zone by using the power information updated by said power comparing and updating portion.

20. A speech processing apparatus according to claim 13, further comprising a spectrum information extracting portion configured to extract spectrum information of the speech-and noise-containing signal at the estimated position to produce an extracted noise signal and a noise removing portion configured to remove the extracted noise signal from the speech-and noise containing speech at the position of the detected user-speaking zone by using the extracted spectrum information.

21. A speech processing apparatus according to claim 20, wherein said noise removing portion produces speech data, said method further comprises a speech recognizing portion configured to recognize the speech data produced by said noise removing portion by removing the extracted noise signal from the speech-and-noise-containing portion.

22. A speech processing apparatus according to claim 13, wherein the speech-and noise-containing signal is produced by a telephone in response to a user speaking into the telephone.

23. A speech processing apparatus according to claim 13, further comprising a speech recognizing portion configured to subject the speech-and-noise-containing signal at the detected user-speaking zone to speech recognition.

24. A speech processing apparatus according to claim 23, further comprising an information outputting portion configured to output information corresponding to a result of speech recognition.

25. A speech processing apparatus according to claim 13, further comprising:

a calculating portion configured to calculate a speech-zone determining threshold only from the power characteristics of the user-not-speaking zone, and wherein said detecting portion detects the position of the user-speaking zone by applying the speech-zone determining threshold to the input speech-and-noise-containing signal and determining that a user-speaking zone exists at positions in the speech-and-noise-containing signal where the value of the power of the speech-and-noise-containing signal is above the speech-zone determining threshold.

26. A recording medium capable of being read by a computer and storing a program instructing the computer to process a speech-and-noise-containing signal comprising at least one predetermined speaking zone comprising a user-not-speaking zone containing only a noise signal and a user-speaking zone containing a speech signal superimposed on the noise signal, said recording medium storing:

a program code for instructing the computer to estimate the position of the user-not-speaking zone in the at least one predetermined speaking zone;

a program code for instructing the computer to extract power information of the speech-and-noise-containing signal at the estimated position of the user-not-speaking zone; and a program code instructing the computer to detect the position of the user-speaking zone by using the extracted power information extracted from the speech-and-noise-containing signal at the estimated position of the user-not speaking zone.

27. A recording medium according to claim 26, wherein the predetermined speaking zone starts at the start of the user-speaking zone.

28. A recording medium according to claim 26, further storing a program code for instructing the computer to determine that a user-speaking zone is present at a position in the speech-and-noise-containing signal when the value of the power information at the position exceeds a threshold defined between the extracted power information and a predetermined value.

29. A recording medium according to claim 26, further storing a program code for instructing the computer to update the value of the power information used to detect the position of a user-speaking zone in the next predetermined speaking zone in the speech-and-noise-containing signal by comparing the value of the extracted power information with the value of the power information of the speech-and-noise-containing signal in the next predetermined zone and setting the value of the power information used to detect the position of a user-speaking zone in the next predetermined zone in the speech-and-noise-containing signal as the value of the power information in the next predetermined speaking zone that is smaller than the value of the extracted power information when the value of the power information in the next predetermined speaking zone is smaller than the value of the extracted power information.

30. A recording medium according to claim 26, further storing a program code for instructing the computer to extract spectrum information of the speech-and noise-containing signal at the estimated position to produce an extracted noise signal and to remove the extracted noise signal from the speech-and-noise-containing signal at the position of the detected user-speaking zone by using the extracted spectrum information.

31. A recording medium according to claim 30, wherein removing the extracted noise signal from the speech-and-noise-containing signal produces speech data, wherein said medium further stores a program code for instructing the computer to subject the speech data to a speech recognition operation.

32. A recording medium according to claim 26, further storing a program code for instructing the computer to subject the speech-and-noise-containing signal at the detected user-speaking zone to a speech recognition operation.

33. A recording medium according to claim 32, further storing a program code for instructing the computer to output information corresponding to a result of said speech recognition operation.

34. A recording medium according to claim 26, further comprising:

a program code for instructing the computer to calculate a speech-zone determining threshold only from the power characteristics of the user-not-speaking zone, wherein said program code for instructing the computer to detect the position of the user-speaking zone instructs the computer to detect the position of the user-speaking zone by applying the speech-zone determining threshold to the input speech-and-noise-containing signal and determining that a user-speaking zone exists at positions in the speech-and-noise-containing signal where the value of the power of the speech-and-noise-containing signal is above the speech-zone determining threshold.

* * * * *

UNITED STATES PATENT AND TRADEMARK OFFICE
CERTIFICATE OF CORRECTION

PATENT NO. : 6,393,396 B1
DATED : May 21, 2002
INVENTOR(S) : Nakagawa et al.

It is certified that error appears in the above-identified patent and that said Letters Patent is hereby corrected as shown below:

Title page,
Item [56], References Cited, U.S. PATENT DOCUMENTS,
"5,812,975    9/1998 Komoti, et al." should read
-- 5,812,975    9/1998 Komori, et al. --.

Column 4,
Line 59, "outputted" should read -- outputted to --.

Column 5,
Line 16, "above" should read -- above- --.

Signed and Sealed this

Fourth Day of March, 2003

JAMES E. ROGAN
*Director of the United States Patent and Trademark Office*